C. BISHOP.
Corn Sheller.
No. 13,634.
Patented Oct 9, 1855.
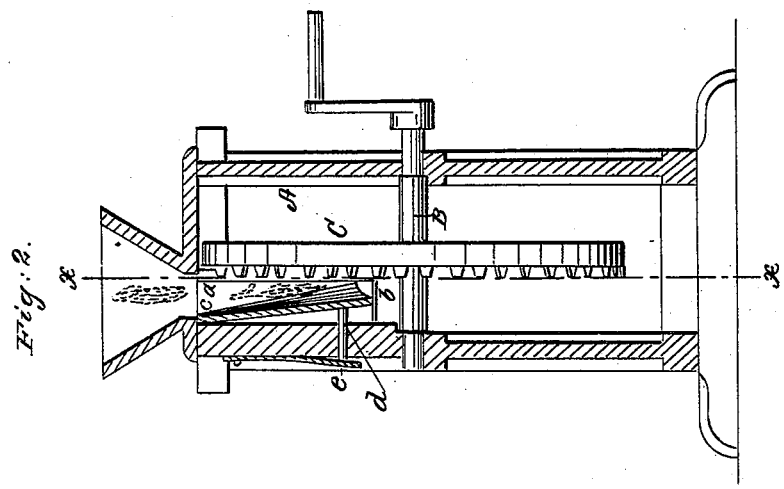
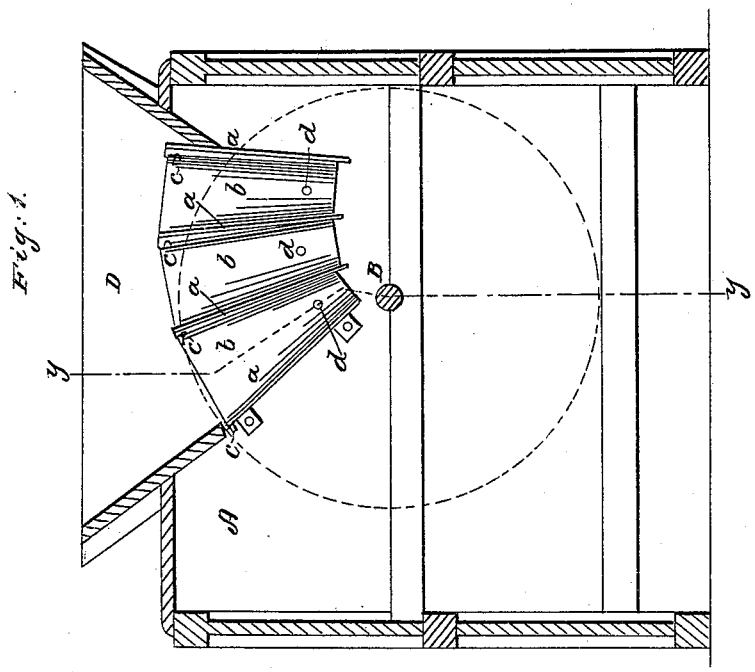

UNITED STATES PATENT OFFICE.

CHAS. BISHOP, OF NORWALK, OHIO.

CORN-SHELLER.

Specification of Letters Patent No. 13,634, dated October 9, 1855.

*To all whom it may concern:*

Be it known that I, CHARLES BISHOP, of Norwalk, in the county of Huron and State of Ohio, have invented a new and Improved Corn-Sheller; and I do hereby declare that the following is a full, clear, and exact description of the same, reference being had to the annexed drawings, making a part of this specification, in which—

Figure 1, is a longitudinal vertical section of my improvement, (x) (x) Fig. 2, showing the plane of section. Fig. 2, is a transverse vertical section of ditto (y), (y) Fig. 1, showing the plane of section.

Similar letters of reference indicate corresponding parts in the two figures.

My invention consists in the combination of a shelling disk or wheel, and a series of ear boxes, constructed and arranged as will be presently shown and described.

To enable others skilled in the art to fully understand and construct my invention, I will proceed to describe it.

A, represents a rectangular casing or box in which a transverse shaft B, is placed.

C, is a wheel hung on the shaft B. One side of this wheel is toothed or corrugated from its center to its periphery.

To the inner surface of one of the sides of the casing or box A, there are attached a series of flanches (a) which project outward at right angles from the side toward the wheel C, and do not quite touch the teeth of the wheel. The flanches (a), extend downward toward a line on one side of the center of the wheel C, and the lower ends of the flanches are nearer together than the upper ends.

In Fig. 1, four flanches are shown. The four flanches form three boxes or divisions. Each box or division has a back plate (b). The upper ends of these plates have arms or pivots (c), which fit loosely in holes in the upper ends of the flanches. The lower ends of the plates (b) have rods (d) attached to them said rods passing through the side of the casing and bearing against springs (e) attached to the outer side of the casing, see Fig. 2. The lower ends of the back plates (b) are placed outward toward the wheel C, the rods (d) keeping them in that position.

On the upper part of the casing or box A, there is placed a hopper D. The ears of corn to be shelled are placed in the hopper D, and motion is given the shaft B, in any proper manner. The ears of corn fall one at a time into the boxes formed by the flanches (a), and the ear in each box is operated upon by the wheel C, which rotate the ears and shell the corn from the cobs. The ears in the boxes although operated upon at the same time by the wheel C, are operated upon independently of each other because each back plate (b) will yield or give corresponding to the size of the ear passing against it and consequently thick and thin ears will be perfectly shelled at the same time.

The ordinary machines have no boxes, and the ears which always vary in size are all acted upon by the wheel and pressed against a common elastic back or wheel; consequently one or more large ears will expand the space between the elastic back or wheel and the shelling wheel C, allow smaller ears to pass through partially shelled. This difficulty is obviated by my improvement.

I do not claim separately the toothed or corrugated wheel C, for that has been previously used, but—

I claim—

In combination with a shelling disk or wheel, such as described, the series of ear boxes radially arranged around it; said boxes being composed of elastic backs and unyielding partitions as described.

CHARLES BISHOP.

Witnesses:
  A. G. SUTTON,
  FRANK SAWYER.